US007448972B2

(12) United States Patent
Garabello et al.

(10) Patent No.: US 7,448,972 B2
(45) Date of Patent: Nov. 11, 2008

(54) SYSTEM FOR TRANSMITTING MOTION BETWEEN THE SHAFT OF AN INTERNAL COMBUSTION ENGINE OF A MOTOR VEHICLE AND A GROUP OF AUXILIARY DEVICES

(75) Inventors: Marco Garabello, Orbassano (IT); Domenico Mesiti, Orbassano (IT); Dario Caenazzo, Orbassano (IT)

(73) Assignee: CRF Societa Consortile Per Azioni, Torino (IT)

( * ) Notice: Subject to any disclaimer, the term of this patent is extended or adjusted under 35 U.S.C. 154(b) by 555 days.

(21) Appl. No.: 10/980,170

(22) Filed: Nov. 4, 2004

(65) Prior Publication Data
US 2005/0148417 A1 Jul. 7, 2005

(30) Foreign Application Priority Data
Nov. 5, 2003 (IT) .......................... TO2003A0878

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *F16H 7/00* | (2006.01) |
| *F16H 55/50* | (2006.01) |
| *F16D 27/08* | (2006.01) |
| *F16D 47/00* | (2006.01) |
| *F16D 41/04* | (2006.01) |
| *F02D 29/06* | (2006.01) |
| *H02K 49/00* | (2006.01) |

(52) U.S. Cl. ........................... 474/74; 474/70; 474/148; 474/168; 192/48.2; 192/48.3; 192/48.92; 290/40 C; 310/92

(58) Field of Classification Search .................. 474/70, 474/148; 192/84.941, 209, 84.961, 48.2, 192/48.3, 48.92, 48.961; 290/40 C, 46–48; 310/92, 103
See application file for complete search history.

(56) References Cited

U.S. PATENT DOCUMENTS 5,330,393 A  *  7/1994  Deppert et al. .............. 475/154

(Continued)

FOREIGN PATENT DOCUMENTS

DE          101 61 700 A1      6/2003

(Continued)

*Primary Examiner*—Robert A. Siconolfi
*Assistant Examiner*—Thomas W Irvin
(74) *Attorney, Agent, or Firm*—Sughrue Mion, PLLC

(57) ABSTRACT

The system includes at least one transmission belt for coupling the shafts of auxiliary devices to a pulley which can be coupled for operation to the shaft of the combustion engine, and an electromagnetically operated clutch between this pulley and the shaft of the engine. An overrunning clutch is interposed between the pulley and the shaft of the engine. The clutch is normally disengaged and de-energized. The pulley has a hub fitted on an extension of the shaft of the engine with the interposition of the overrunning clutch, and has a channel-shaped cross section with a concavity facing the internal combustion engine. The electromagnetically operated clutch comprises a winding which is fixed to the engine and which extends into the concavity of the pulley, and a ferromagnetic ring carried in an axially translatable way by a support element fixed with respect to rotation to the extension of the shaft of the engine.

4 Claims, 3 Drawing Sheets

U.S. PATENT DOCUMENTS

| | | | |
|---|---|---|---|
| 5,700,212 A | 12/1997 | Meckstroth | |
| 5,827,143 A * | 10/1998 | Monahan et al. | 474/73 |
| 6,083,130 A | 7/2000 | Mevissen et al. | |
| 6,578,561 B1 * | 6/2003 | Koch | 123/559.3 |
| 6,679,796 B2 * | 1/2004 | Sugano | 474/28 |
| 6,688,022 B2 * | 2/2004 | Hanafusa et al. | 37/257 |
| 6,758,781 B2 * | 7/2004 | Kusumoto et al. | 475/13 |
| 6,823,974 B2 * | 11/2004 | Hayashi | 192/84.961 |
| 6,893,368 B2 * | 5/2005 | Fujiwara et al. | 474/70 |
| 7,090,063 B2 * | 8/2006 | Imai et al. | 192/84.941 |
| 2002/0117860 A1 * | 8/2002 | Man et al. | 290/46 |
| 2002/0165053 A1 * | 11/2002 | Kimura et al. | 474/70 |
| 2003/0213252 A1 * | 11/2003 | Kuribayashi | 62/133 |
| 2003/0224903 A1 * | 12/2003 | Kitamura et al. | 477/5 |
| 2004/0079098 A1 * | 4/2004 | Uno et al. | 62/236 |
| 2004/0164560 A1 * | 8/2004 | Odahara et al. | 290/40 C |
| 2005/0217288 A1 * | 10/2005 | Uno et al. | 62/157 |
| 2006/0025257 A1 * | 2/2006 | Tanabe et al. | 474/199 |

FOREIGN PATENT DOCUMENTS

| | | |
|---|---|---|
| EP | 0 916 546 A2 | 5/1999 |
| EP | 1 079 085 A2 | 2/2001 |
| EP | 1 249 360 A1 | 10/2002 |
| EP | 1 321 646 A1 | 6/2003 |
| FR | 2 378 948 A | 8/1978 |
| WO | WO 94/12810 | 6/1994 |

* cited by examiner

SYSTEM FOR TRANSMITTING MOTION BETWEEN THE SHAFT OF AN INTERNAL COMBUSTION ENGINE OF A MOTOR VEHICLE AND A GROUP OF AUXILIARY DEVICES

BACKGROUND OF THE INVENTION

The present invention relates to a system for transmitting motion between the shaft of an internal combustion engine of a motor vehicle and a group of auxiliary devices provided with corresponding drive shafts and comprising an electrical machine capable of acting selectively as a generator and as a motor.

More specifically, the invention relates to a transmission system of the type defined in the introductory part of claim 1 which follows the present description.

There is a known motion transmission system of this type having an electromagnetically operated clutch which is normally energized and engaged to couple the aforesaid pulley to the shaft of the internal combustion engine with respect to rotation. This known system can be used to provide the following functions or operating conditions:

- driving the auxiliary devices (air-conditioning system compressor, electrical machine acting as generator, etc.) while the internal combustion engine is running; the electromagnetically operated clutch is engaged and energized;
- driving the auxiliary devices, particularly the air-conditioning system compressor, while the internal combustion engine is stopped; in this case, the electromagnetically operated clutch is de-energized and therefore disengaged, and the aforesaid electrical machine is made to operate as a motor to rotate the compressor by means of the aforesaid transmission belt; and
- restarting the internal combustion engine (while hot) by means of the aforesaid electrical machine, operating as a motor, for example in order to provide what is known as a stop-start function; in this case, the electromagnetically operated clutch is energized and engaged to couple the said electrical machine to the shaft of the internal combustion engine in the restarting phase.

The known system described above has the disadvantage of requiring the electromagnetically operated clutch to be permanently energized while the internal combustion engine is running. The prolonged energizing of this clutch creates a consumption of electrical energy which has a negative effect on the overall energy balance.

SUMMARY OF THE INVENTION

One object of the present invention is to propose an advantageous embodiment of a motion transmission system of the type specified above.

BRIEF DESCRIPTION OF THE DRAWINGS

Further characteristics and advantages of the invention will be made clear by the following detailed description provided purely by way of example and without restrictive intent, with reference to the attached drawings, in which.

DETAILED DESCRIPTION OF THE INVENTION

Figure 1:
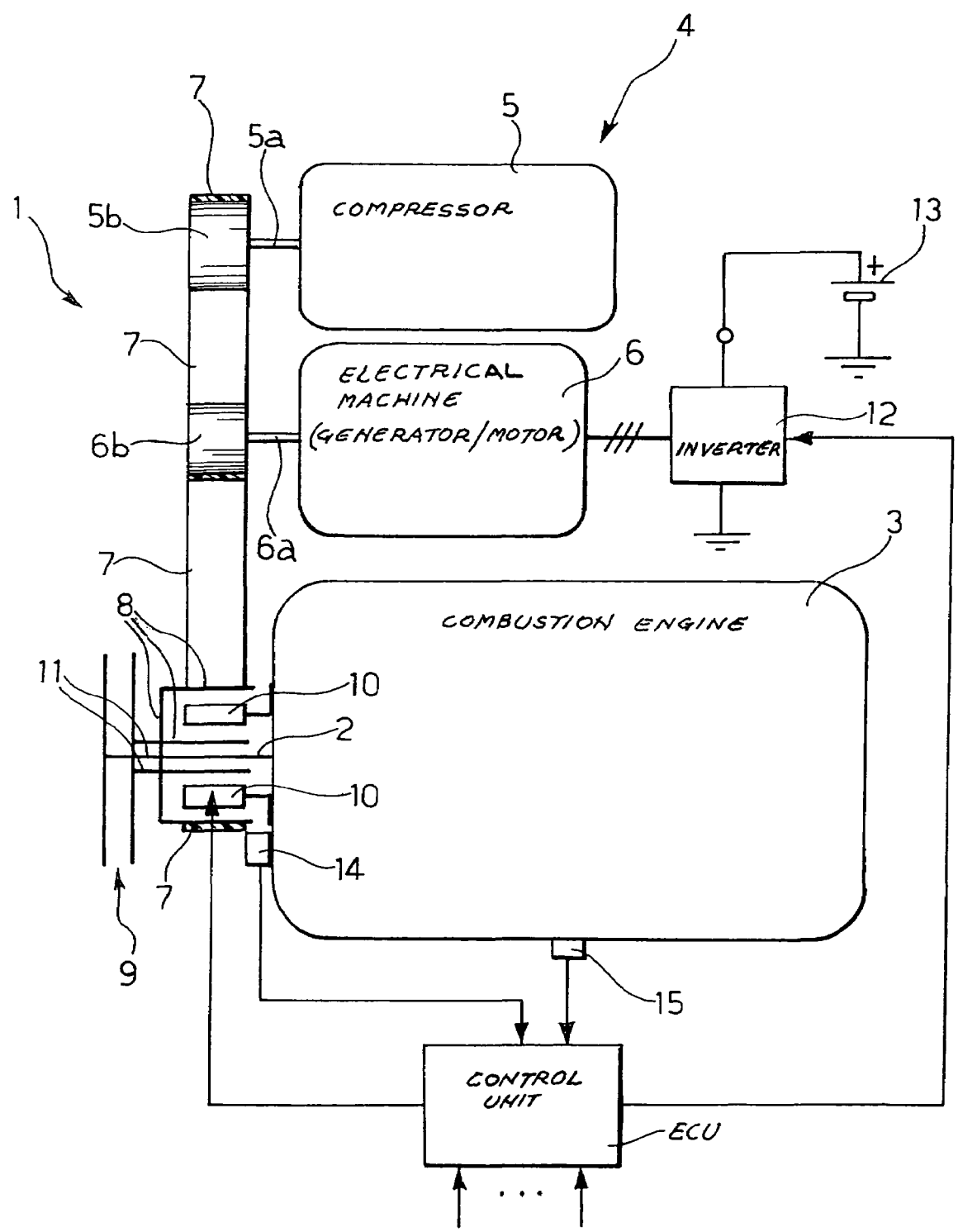
FIG. 1 is a schematic representation of a motion transmission system.

In the drawings, the number 1 indicates the whole of a transmission system for transmitting the motion between the shaft 2 of an internal combustion engine 3 of a motor vehicle (not shown) and a group of auxiliary devices, indicated as a whole by 4.

In the embodiment illustrated by way of example, this group of auxiliary devices 4 comprises a compressor 5 for a system for air-conditioning the passenger compartment of the motor vehicle, and a reversible electrical machine 6 capable of operating selectively as a generator and as an electric motor. This electrical machine 6 is, for example, a three-phase asynchronous machine.

The auxiliary devices 5 and 6 are provided with corresponding drive shafts 5a and 6a, on which corresponding pulleys 5b and 6b are keyed.

With reference to FIG. 1, the transmission system 1 comprises at least one transmission belt 7 which couples the pulleys 5b and 6b of the auxiliary devices 5 and 6, with respect to rotation, to a pulley 8 which can be coupled for operation to the shaft 2 of the internal combustion engine 3 in the ways which are described below.

The number 9 indicates an electromagnetically operated friction clutch, for selectively controlling the coupling between the pulley 8 and the shaft 2 of the internal combustion engine 3. This clutch 9 comprises an excitation winding 10 of annular shape, positioned around the axis of the shaft 2 of the internal combustion engine 3, and fixed to the engine 3.

As shown schematically in FIG. 1, an overrunning clutch 11 (known as a "free wheel") is interposed between the pulley 8 and the shaft 2 of the internal combustion engine 3. This overrunning clutch 11 is made in such a way that when the angular velocity of the shaft 2 of the internal combustion engine 3 is greater or less than that of the pulley 8, this pulley 8 can be, respectively, rotated by the shaft 2 or made free-running with respect to this shaft.

The electromagnetically operated clutch 9, which is interposed between the shaft 2 of the internal combustion engine and the pulley 8, is normally de-energized and disengaged.

The system 1 also comprises a control unit ECU designed to cause the energizing of the winding 10 and the consequent engagement of the electromagnetically operated clutch 9 and the activation of the electrical machine 6 as a motor when the internal combustion engine 3 is stopped, in order to restart this engine from the hot state by means of the electrical machine 6 operating as a motor.

For this purpose, the control unit ECU is designed, for example, to drive a controlled bridge inverter circuit 12 (FIG. 1) connected to the electrical machine 6 and to a rechargeable source of continuous voltage such as a battery 13.

Conveniently, the unit ECU is also connected to a sensor 14 for providing it with signals indicating the speed of rotation of the shaft 2 of the internal combustion engine 3 and a sensor 15 for providing it with signals indicating the temperature of this engine.

The motion transmission system 1 described above with reference to FIG. 1 operates essentially in the following way.

When the internal combustion engine 3 is running, the electromagnetically operated clutch 9 is de-energized and disengaged. It therefore consumes no energy.

In this condition, the pulley 8 can be rotated by the shaft 2 of the internal combustion engine 3 via the interposed overrunning clutch 11. The rotation of the pulley 8 by the belt 7 causes the rotation of the auxiliary devices 5 and 6. In particular, the electrical machine 6 can operate as a generator to recharge the battery 13.

When the internal combustion engine 3 is stopped, the pulley 8 is therefore disengaged with respect to rotation from the shaft 2 of this engine, and the control unit ECU can, if required, cause the operation of the compressor 5 of the air-conditioning system by making the electrical machine 6 operate as an electric motor (by means of the inverter 12). The torque is transmitted from the shaft 6a of the electrical machine 6 to the shaft 5a of the compressor 5 by means of the belt 7 and the pulley 8 which is disengaged with respect to rotation from the shaft 2 of the internal combustion engine. The electromagnetically operated clutch 9 remains in this de-energized and disengaged condition.

The control unit ECU can cause the engagement of the clutch 9 and the coupling of the shaft 2 of the engine 3 to the pulley 8 with respect to rotation, when the internal combustion engine 3 has to be started from the hot state, without making use of the special electric starter motor, for example in order to provide what is known as a stop-start operating mode to minimize consumption and emissions. When the clutch 9 has been energized and re-engaged, the control unit ECU causes the electrical machine 6 to operate as an electric motor, in such a way as to rotate the shaft 2 of the internal combustion engine 3 by means of the belt 7 and the pulley 8.

The system described above has the advantage of providing automatic coupling between the shaft of the internal combustion engine and the transmission belt 7 as soon as the speed of rotation of the engine 3 exceeds the speed of rotation of the pulley 8.

The use of the electromagnetically operated clutch is limited to the sole function of hot-starting the internal combustion engine.

When the internal combustion engine is running, the electromagnetically operated clutch is de-energized and disengaged, and does not consume energy.

This electromagnetically operated clutch can also be conveniently designed to handle only the torque required for the hot starting of the internal combustion engine, and this component is therefore relatively economical.

Figure 2:
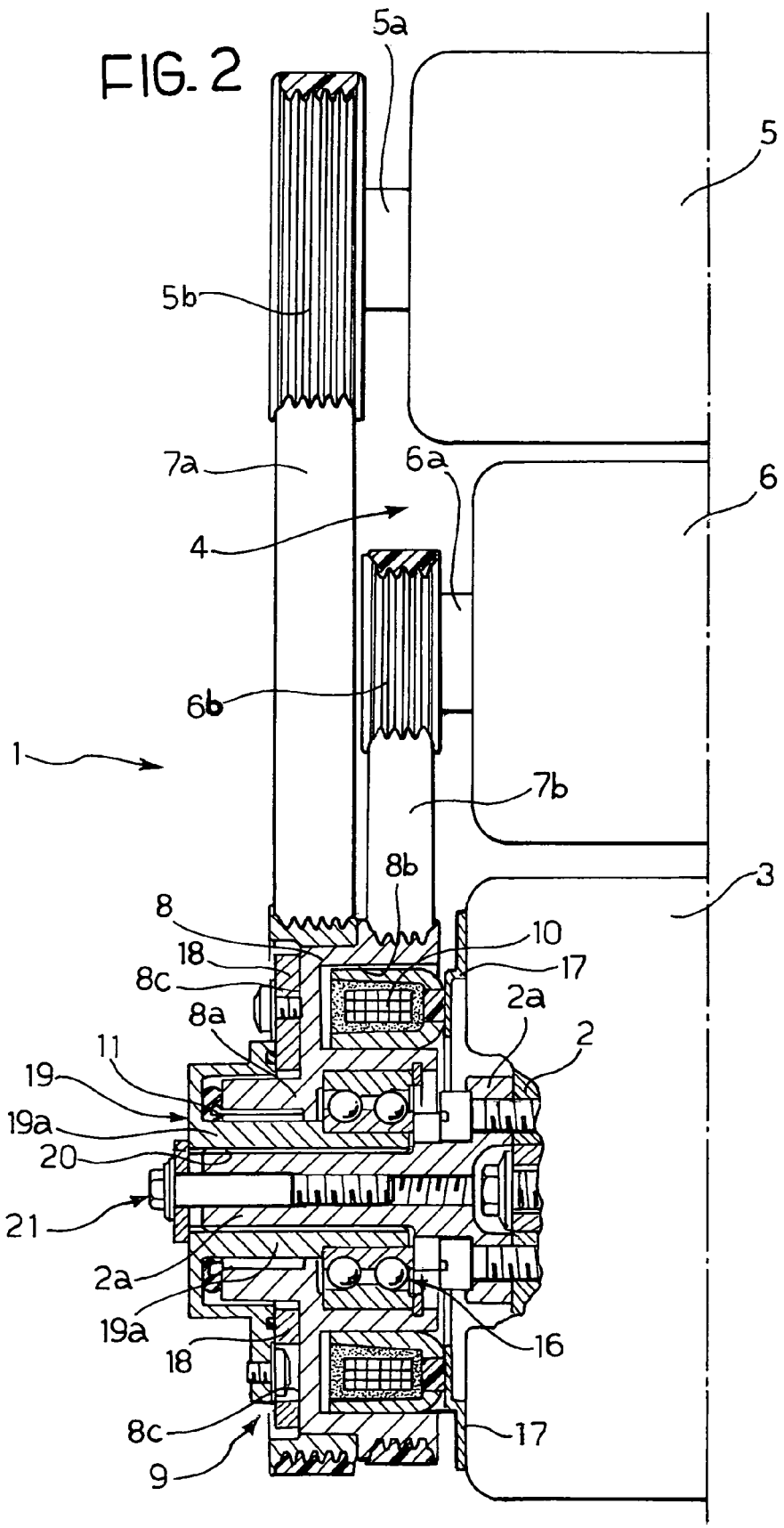
FIG. 2 is a partial view, partially in cross section, of an embodiment of the motion transmission system according to the invention.

FIG. 2 shows an embodiment of part of a motion transmission system according to the invention.

In this figure, the reference numbers used previously have again been allocated to parts and elements which have already been described.

In the embodiment shown in FIG. 2, the pulley 8 is coupled to pulley 5b of the compressor 5 and pulley 6b of the electrical machine 6 by means of two separate belts, indicated by 7a and 7b respectively.

This pulley 8 has a tubular hub 8a which is fitted on an extension 2a of the shaft 2 of the internal combustion engine 3, with the interposition of the overrunning clutch 11 and, in parallel with the latter, a rotating element bearing 16.

In the illustrated embodiment, the radially outermost part of the pulley has a channel-like cross section, with the concavity facing the internal combustion engine 3. The excitation winding 10 of the clutch 9 is fixed to the internal combustion engine 3 by means of an annular support 17 and extends into the recess 8b of the pulley 8.

The electromagnetically operated clutch 9 comprises a ring 18 of ferromagnetic material supported in an axially translatable way by a supporting element 19 which is fixed with respect to rotation to the extension 2a of the shaft 2 of the internal combustion engine. In the illustrated embodiment, the supporting element 19 has a hub 19a fitted by means of a splined connection 20 on the extension 2a of the shaft 2 of the combustion engine, and locked axially by means of a bolt 21.

The ring of ferromagnetic material 18 and/or the annular face or surface 8c of the pulley 8 have the function of providing a friction drive.

The arrangement is such that the energizing of the winding 10 can cause the attraction of the ring 18 in the axial direction towards the annular surface 8c of the pulley, and the consequent engagement of the clutch 9.

The modes of operation of the system illustrated in FIG. 2 correspond to the modes described above with reference to the diagram of FIG. 1.

Figure 3:
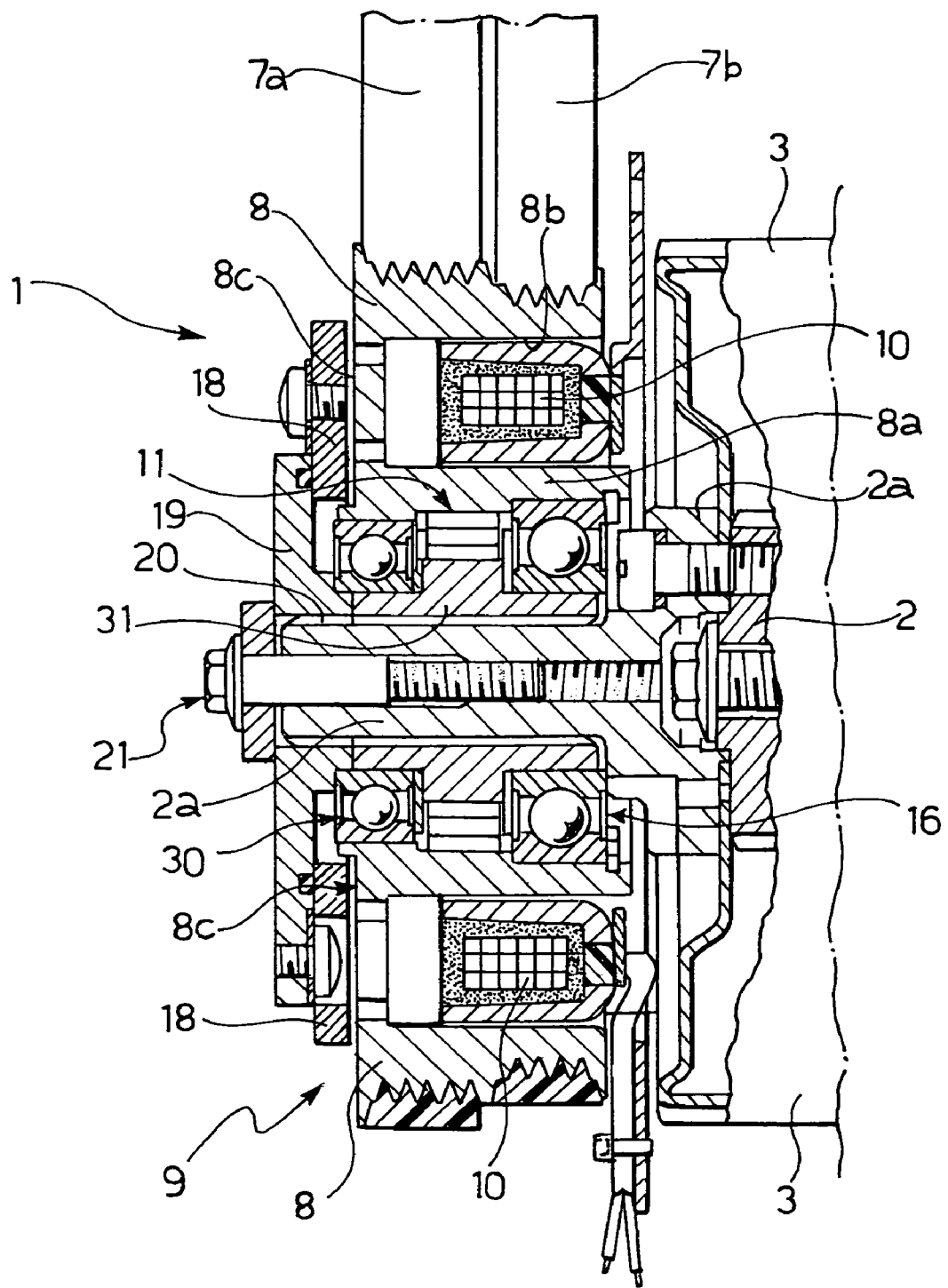
FIG. 3 is a partial view, partially in cross section, of another embodiment of the system according to the invention.

FIG. 3 shows a variant embodiment. In this figure, the same numerical references used previously have again been allocated to parts and elements which are identical to, or essentially correspond to, elements described previously with reference to FIGS. 1 or 2.

In the variant shown in FIG. 3, the pulley 8 is supported rotatably by means of two rotating element bearings 16 and 30 carried by an intermediate element 31 which is fitted by means of a splined connection on the extension 2a of the shaft 2 of the combustion engine 3.

The free wheel 11 is interposed axially between the said bearings 16 and 30, around the intermediate portion of the element 31.

The mode of operation of the variant shown in FIG. 3 is similar to that described with reference to the preceding figures.

Clearly, provided that the principle of the invention is retained, the forms of embodiment and the details of construction can be varied widely from what has been described and illustrated purely by way of example and without restrictive intent, without departing from the scope of the invention as defined in the attached claims.

What is claimed is:

1. A System for transmitting motion between the shaft of an internal combustion engine of a motor vehicle and a group of auxiliary devices provided with corresponding drive shafts and comprising an electrical machine capable of operating selectively as a generator and as a motor;

the system including:

at least one transmission belt for coupling the drive shafts of the aforesaid auxiliary devices to a pulley which can be coupled for operation to the shaft of the combustion engine; and an electromagnetically operated clutch, for selectively controlling the coupling of the said pulley to the shaft of the internal combustion engine;

an overrunning clutch being interposed between the said pulley and the shaft of the internal combustion engine, such that when the angular velocity of the shaft of the internal combustion engine is, respectively, greater or less than that of the said pulley, said pulley is, respectively, rotated by the shaft of the internal combustion engine or made idle with respect to the said shaft;

the electromagnetically operated clutch being normally disengaged and de-energized;

the system additionally comprising control means designed to cause the energizing and engagement of the said clutch and the activation of the said electrical machine as a motor, while the internal combustion engine is stopped, in order to restart the internal combustion engine by means of the said electrical machine operating as a motor;

the said pulley having a hub fitted on an extension of the shaft of the internal combustion engine with the interposition of the said overrunning clutch; the pulley having a channel-shaped cross section with a concavity facing the internal combustion engine; the electromagnetically operated clutch comprising:

an excitation winding which is fixed to the internal combustion engine and which extends into the said concavity of the pulley, and a ring of ferromagnetic material carried in an axially translatable way by a support element fixed with respect to rotation to the extension of the shaft of the internal combustion engine; the said ring facing an annular surface of the pulley on the opposite side of the pulley from the excitation winding; the said ring and/or the said annular surface of the pulley being capable of providing a frictional drive action;

the arrangement being such that the energizing of the said winding can cause the attraction of the said ring in the axial direction towards the said annular surface of the pulley and the consequent engagement of the electromagnetically operated clutch.

2. A motion transmission system according to claim 1, in which at least one rotating element bearing is interposed between the hub of the pulley and the said extension of the shaft of the internal combustion engine, in parallel with the overrunning clutch.

3. A motion transmission system according to claim 2, in which the overrunning clutch is positioned axially between two rotating element bearings fitted between the pulley and the said extension of the shaft of the internal combustion engine.

4. A motion transmission system according to claim 1, in which the said electrical machine is a multi-phase asynchronous machine, and the said control means comprise a controlled inverter connected to the said electrical machine and to a rechargeable source of continuous voltage.

* * * * *